(12) United States Patent
Yamada

(10) Patent No.: US 6,912,095 B2
(45) Date of Patent: Jun. 28, 2005

(54) PROJECTION LENS SYSTEM

(75) Inventor: Yasuharu Yamada, Saitama (JP)

(73) Assignee: Tamron Co., Ltd., Saitama-Ken (JP)

( * ) Notice: Subject to any disclaimer, the term of this patent is extended or adjusted under 35 U.S.C. 154(b) by 70 days.

(21) Appl. No.: 10/668,212

(22) Filed: Sep. 24, 2003

(65) Prior Publication Data
US 2004/0066562 A1 Apr. 8, 2004

(30) Foreign Application Priority Data

Oct. 3, 2002 (JP) ......................................... 2002-291122

(51) Int. Cl.[7] .................. G02B 15/14; G02B 13/22; G02B 17/00; G02B 9/60; G02B 9/12
(52) U.S. Cl. ................ 359/689; 359/663; 359/735; 359/770; 359/784; 359/786; 359/787; 359/788; 355/53; 396/72
(58) Field of Search ............................... 359/689, 663, 359/735, 708, 645, 661, 716, 748, 746, 770, 784, 786, 787, 788; 355/53; 396/72

(56) References Cited

U.S. PATENT DOCUMENTS

| | | | |
|---|---|---|---|
| 6,285,516 B1 * | 9/2001 | Ori .......................... | 359/770 |
| 6,308,011 B1 * | 10/2001 | Wachi et al. ................. | 396/72 |
| 6,324,014 B1 * | 11/2001 | Moskovich ................. | 359/651 |
| 6,452,728 B2 * | 9/2002 | Shikama ..................... | 359/651 |
| 6,476,981 B1 * | 11/2002 | Shikama ..................... | 359/750 |
| 6,621,555 B1 * | 9/2003 | Terasawa et al. ............. | 355/53 |
| 6,771,433 B2 * | 8/2004 | Ohashi ....................... | 359/689 |
| 6,781,770 B1 * | 8/2004 | Chang et al. ............... | 359/689 |

FOREIGN PATENT DOCUMENTS

| | | | |
|---|---|---|---|
| JP | 10260346 A | 9/1998 | ........... G02B/13/04 |
| JP | 1194265 A | 7/1999 | ........... G02B/13/04 |
| JP | 2001324675 A | 11/2001 | ........... G02B/13/04 |
| JP | 2001337267 A | 12/2001 | ........... G02B/13/04 |
| JP | 2002031754 A | 1/2002 | ........... G02B/13/24 |

* cited by examiner

Primary Examiner—Loha Ben
(74) Attorney, Agent, or Firm—Jacobson Holman PLLC

(57) ABSTRACT

A compact and light-weighted projection lens system that is capable of projecting an image at an angle as wide as 75 degrees with sufficient field angle and brightness as represented by F number of approximately 2.4, that is capable of effectively correcting chroic aberration of magnification and aberration of distortion and exhibiting optical stability against environmental variations, and that is suitable for obtaining an extraordinarily fine image by the magnification and projection. In the projection lens system that comprises first to third groups of lenses in the order from the closest a magnified image where the first lens group of negative refractive power includes one or more aspherical lenses each having an aspherical plane on one or both of the surfaces, the second lens group of positive refractive power includes one or more positive lenses, and third lens group of positive refractive power includes one or more cemented triplet lenses comprised of three lenses of positive, negative, and positive attributes joined in this order, a projection lens system is characterized by terms and conditions defined as in the following formulae:

$$0.9<|f1|/f<1.4 \quad (1)$$

$$2.1<f2/f<3.4 \quad (2)$$

$$1.9<f3/f<2.8 \quad (3)$$

where f is a total focal length throughout the projecting lens system, f1 is a focal length of the first group of lenses, f2 is a focal length of the second group of lenses, and f3 is a focal length of the third group of lenses.

3 Claims, 4 Drawing Sheets

PROJECTION LENS SYSTEM

FIELD OF THE INVENTION

The present invention relates to a projection lens system dedicated to magnifying and projecting an image presented by a liquid crystal display device, a digital micro mirror device, or the like, and more particularly, it relates to a projection lens system of which projection field angle is about 75 degrees, F number is about 2.4, and reducing optics are generally telecentric.

PRIOR ART

Conventionally, there have been proposed a variety of projection lens systems used to magnify and project an image from an apparatus like a liquid crystal display device onto a screen. For these recent years, more downsized image projection display apparatuses have been continually developed, and miniaturization of a projection lens system and maximization of its field angle are requirements for downsizing. Especially, a projection lens system of widened field angle often employs the so-called "negative lens leading optical system" where among several lens groups, the one which shows negative refractive power precedes to others, as shown in Japanese Patent Laid-open No. 2002-31754, which is incorporated herein by reference.

This type of lens system is characteristically advantageous in that it facilitates to widen a field angle and ensure a longer back focus comparing with a focal length, and hence, some optical element such as a dichroic prism, a total reflection prism, or the like can be disposed between the lenses and the image display device without difficulty.

So far, however, there exists no such compact and light-weighted projection lens system that is capable of projecting an image at an angle as wide as 75 degrees with sufficient field angle and brightness as represented by F number of approximately 2.4, that is capable of effectively correcting chroic aberration of magnification and aberration of distortion and exhibiting optical stability against environmental variations, and that is suitable to obtaining an extraordinarily fine image by the magnification and projection.

In many cases, the aforementioned negative lead lens system, which has a lens group of negative refractive power preceding to others, use an aspherical lens for the lens group of negative refractive power closest to a magnified image to correct aberration of distortion. The lens group of negative refractive power are, however, relatively great in lens diameter, which leads to an increase in a cost because of the aspherical lens made of glass. For that reason, the aspherical lens often is a plastic mold, but such a plastic lens shows poor stabilities of refractive index and shape due to variations in temperature and humidity; especially, in an environment where illumination lamp heats the optics to some significant extent, the performance of the optics might be undesirably degraded. For example, a projection lens system in the Patent Document 1 has its plastic aspherical lens to be restricted in power and incident angle of beams thereon to overcome the troubles.

SUMMARY OF THE INVENTION

The present invention is made to overcome the aforementioned disadvantages of the prior art projection lens system, and accordingly, it is an object of the present invention to provide a compact and light-weighted projection lens system that is capable of projecting an image at an angle as wide as 75 degrees with sufficient field angle and brightness as represented by F number of approximately 2.4, that is capable of effectively correcting lateral chromatic aberration and aberration of distortion and exhibiting optical stability against environmental variations, and that is suitable to obtaining an extraordinarily fine image by the magnification and projection.

In a projecting lens system in accordance with the present invention that comprises first to third groups of lenses in the order from the closest to magnification optics where the first lens group of negative refractive power include one or more aspherical lenses each having an aspherical plane on one or both of the surfaces, the second lens group of positive refractive power includes one or more positive lenses, and the third lens group of positive refractive power includes one or more cemented triplet lenses comprised of three lenses of positive, negative, and positive power attributes joined in this order, the projection lens system is characterized by terms and conditions defined as in the following formulae:

$$0.9 < |f1|/f < 1.4 \tag{1}$$

$$2.1 < f2/f < 3.4 \tag{2}$$

$$1.9 < f3/f < 2.8 \tag{3}$$

where f is a total focal length throughout the lens system, f1 is a focal length of the first group of lenses, f2 is a focal length of the second group of lenses, and f3 is a focal length of the third group of lenses.

In the present invention, the formula (1) is a definition of a rate of the focal length f1 of the first lens group to the total focal length f of throughout the optics in the projection lens system. Above an upper extreme given by the formula (1), the first lens group shows a greater focal length, which causes a difficulty in ensuring a long back focus. Below a lower extreme of the formula (1), the first lens group shows a shorter focal length, which makes a correction of aberrations difficult.

The formula (2) defines a rate of the focal length f2 to the total focal length f of the whole optics in the projection lens system. Above an upper extreme of the formula (2), the second lens group shows a longer focal length, which gives some merit in correcting aberrations, but nevertheless, causes a greater length of the whole lenses as well as a greater outer diameter of the first lens group, which results in a cost increase. Below a lower extreme given by the formula (2), in contrast, the focal length of the second lens group becomes shorter, which causes a difficulty in correcting aberrations.

The formula (3) gives a definition of a rate of the focal length f3 of the third lens group to the total focal length f of the whole optics in the projection lens system. Above an upper limit of the formula (3), the third lens group shows a longer focal length, which brings about an advantageous effect upon a correction of aberrations, but nevertheless, results in an unnecessarily longer back focus, which is to get the total length of the whole lenses greater so that the dimensional increase of the whole lenses leads to a cost increase. In contrast, below a lower limit of the formula (3), the focal length of the third lens group becomes shorter, which causes difficulties in ensuring a sufficiently long back focus as well as in correcting aberrations.

A first preferred embodiment of the present invention is characterized in that the first group of lenses includes a composite (hybrid) spherical lens(es) of glass which is bonded with thin resin at its surface and then subjected to molding so as to shape an interface between the resin and the air into an aspherical plane.

In the first embodiment of the present invention, the first lens group, which include the composite (hybrid) aspherical lens made of glass lens and thin resin adhered thereto by molding to have an aspherical plane at the interface between the resin and the air, attains improved stability in refractive index and shape against variations in temperature and humidity, compared with plastic aspherical lenses; especially, when an illumination lamp heats them to some significant extent, an enhanced optical performance can be easily assured.

This kind of composite (hybrid) aspherical lens is more cost effective in comparison with aspherical lenses shaped by grinding a surface of a glass lens into an aspherical plane or by molding it aspherical, and further, it's cost ranking is hardly distinguished from that of plastic aspherical lenses.

A second preferred embodiment according to the present invention is characterized in that focusing is attained by displacement of the second group of lenses in a range satisfying the following formula:

$$-0.1 < 1/\beta 2 < 0.1 \tag{4}$$

where $\beta 2$ is an imaging magnification.

In the second embodiment of the present invention, an inner focusing scheme is carried out by moving only the second group of lenses for focusing herein, and therefore, this reduces a variation in aberration in contrast to a scheme of displacing the whole lens system or the front lens (first lens group), which facilitates a correction of the aberration, and additionally, enables a retention of relatively small effective diameter of the lenses to effectively downsize the lens system.

The formula (4) defines an image magnification of the second group of lenses. Beyond upper and lower extremes given by the formula (4), an incident angle of paraxial rays directed from the second lens group upon the third lens group gets large, and this results in a variation in spherical aberration being raised in the third lens group during the focusing, which makes a correction of the aberration difficult.

DETAILED DESCRIPTION OF THE INVENTION

Referring to the accompanying drawings, preferred embodiments of a projection lens system of according to the present invention will be described.

Figure 1:
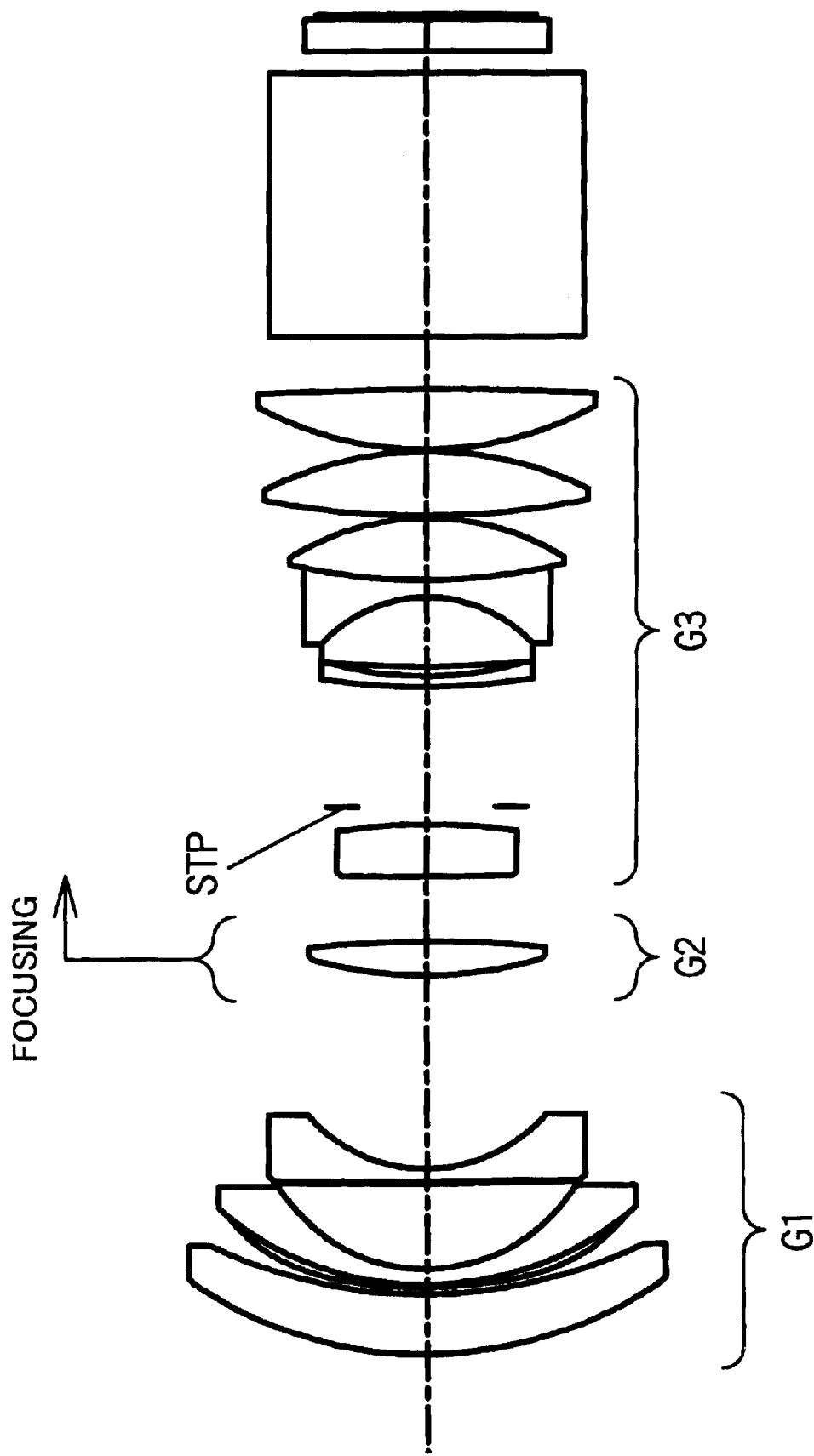
FIG. 1 is an optical diagram showing a projection lens system of a preferred embodiment according to the present invention.

FIG. 1 is a cross sectional view of lenses in the exemplary projection lens system. In FIG. 1, reference alphanumerical symbols G1, G2 and G3 denote a first group of lenses of negative refractive power, a second group of lenses of positive refractive power, and a third group of lenses of positive refractive power, respectively, and STP designates an aperture stop.

Figure 2:
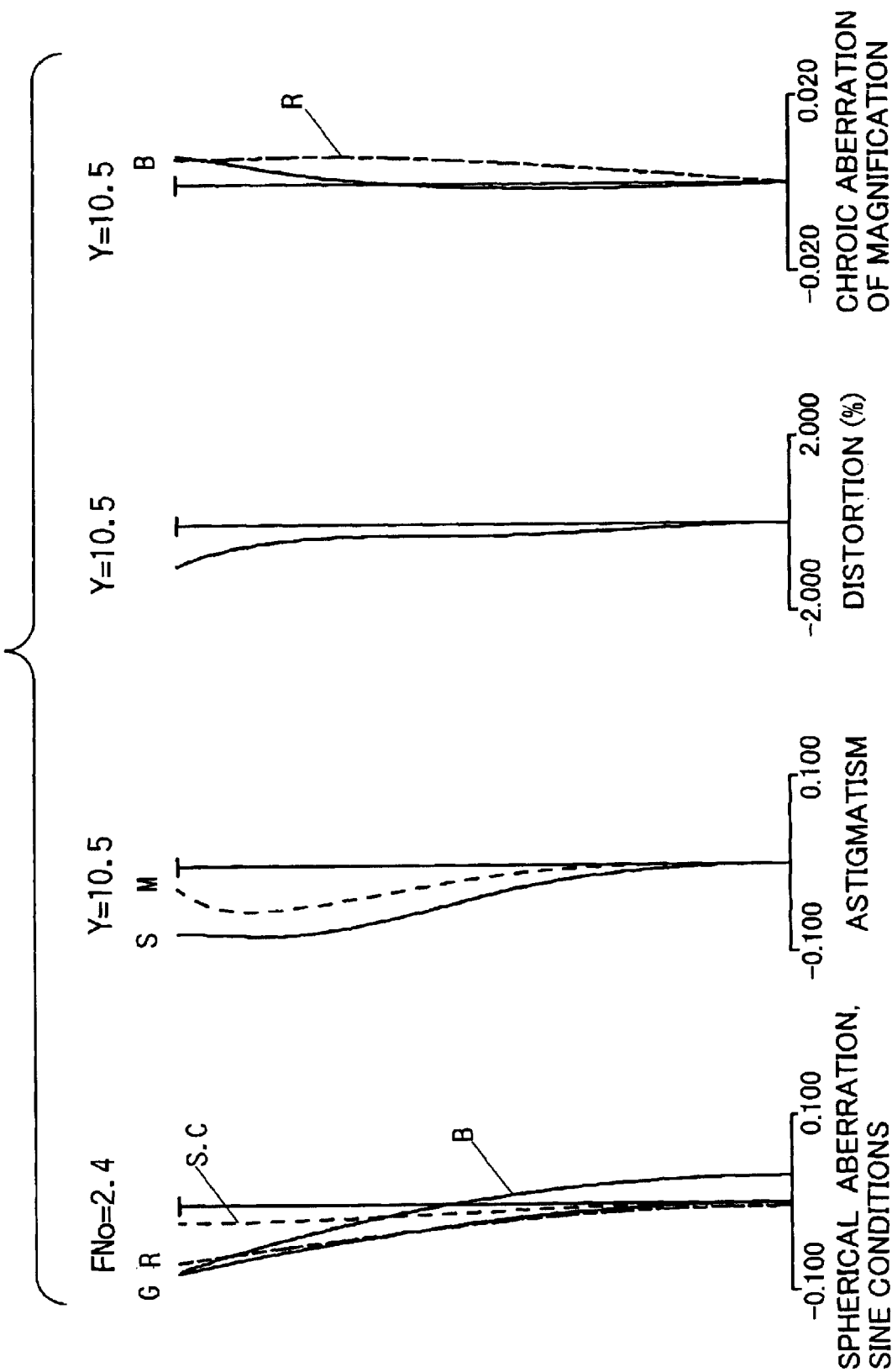
FIG. 2 is a diagram illustrating aberrations in 40-inch dimensions of screen occurred in the exemplary projection lens system.
Figure 3:
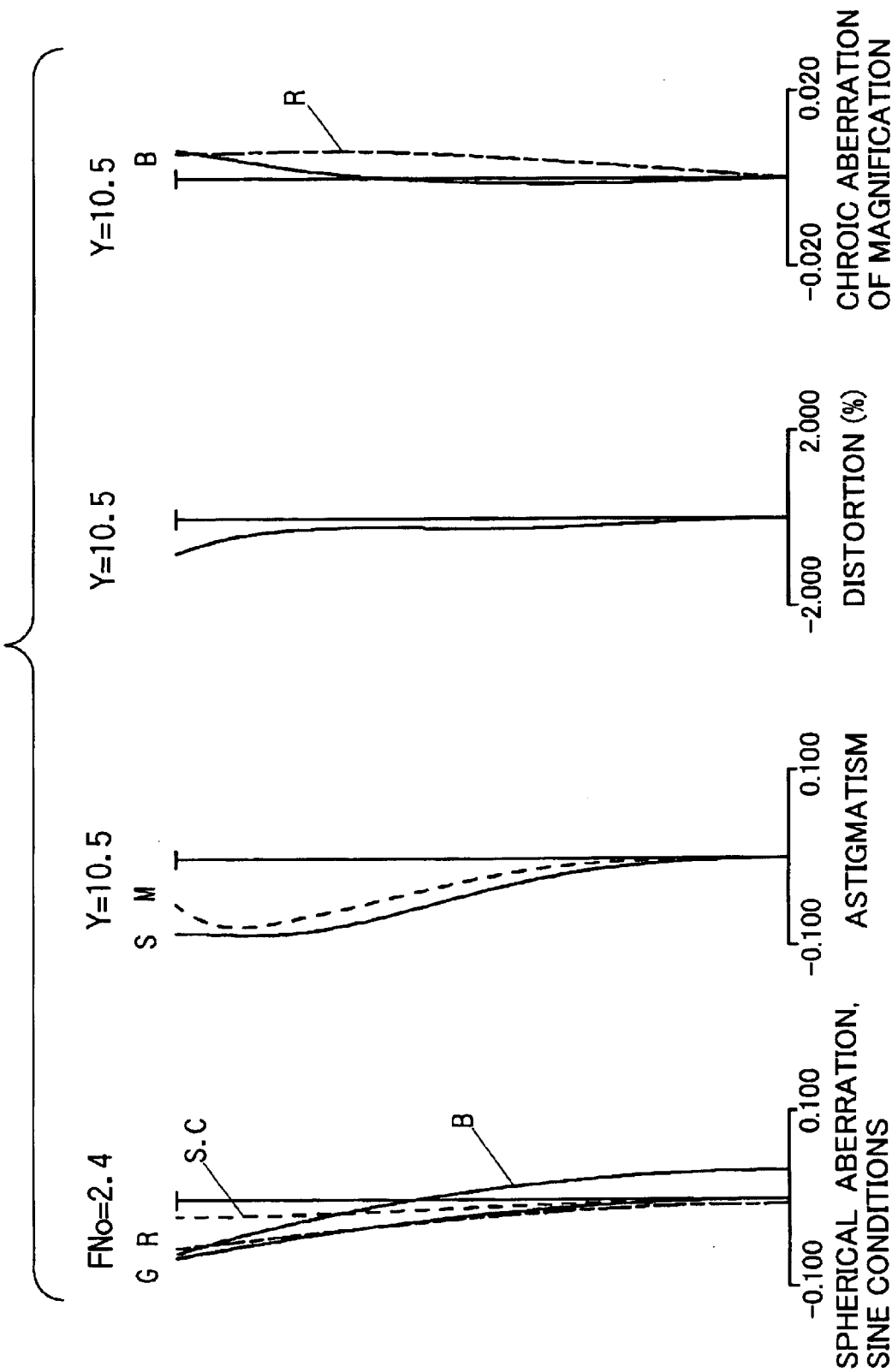
FIG. 3 is a diagram illustrating aberrations in 52-inch dimensions of screen occurred in the exemplary projection lens system.
Figure 4:
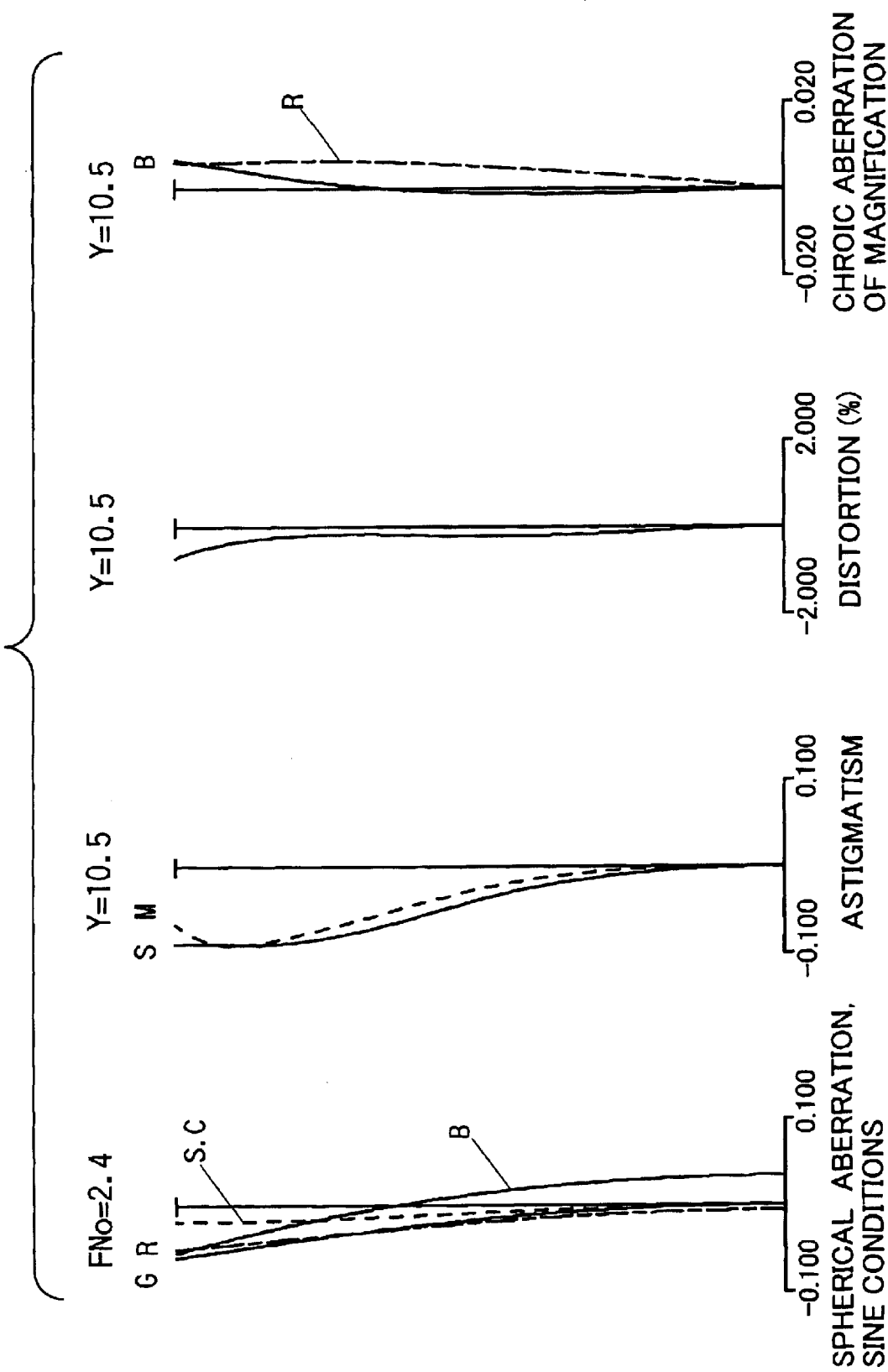
FIG. 4 is a diagram illustrating aberrations in 61-inch dimensions of screen occurred in the exemplary projection lens system.

FIGS. 2, 3 and 4 are diagrams illustrating aberrations in 40-inch, 52-inch and 61-inch dimensions of screen occurred in the exemplary projection lens system, respectively. In FIGS. 2 and 4, aberrations for wavelengths λ=450 nm, =546 nm, and =650 nm are denoted by B for Blue, G for Green and R for Red, respectively.

In the exemplary projection lens system, f is a focal length, F no is an F number, # is a plane number, r is a radius of curvature of a lens plane, d is a lens thickness or an air interval, n and ν are a refractive index and an Abbe number for d-ray (λ=587.6 nm), respectively.

In the following table of optical elements, any plane represented by a number prefixed with an asterisk (*) is a surface aspherical in shape. An equation expressing the aspherical shape is given as follows where H is a height perpendicular to an optical axis, X(H) is a displacement along the optical axis at the height H with an original point of an apex of the surface, R is a paraxial radius of curvature, ε is a constant of the cone, and An is a coefficient of an aspheric surface in the order of n:

$$X(H)=(H^2/R)/\{1+[1-(1+\epsilon)\cdot(H^2/R^2)]^{1/2}\}+A4H^4+A6H^6+A8H^8+A10H^{10} \tag{5}$$

(Optical Elements)

f=13.44~13.46~13.47
F no=2.40~2.40~2.40

| d# | r | d | n | ν |
|---|---|---|---|---|
| 0 | ∞ | d0 = 655.137~860.338~1014.240 | | |
| (Plane of Object) | | | | |
| 1 | 39.5211 | 5.664 | 1.80400 | 46.6 |
| 2 | 47.07 | 0.6616 | | |
| *3 | 59.1362 | 0.2 | 1.51460 | 50.0 |
| 4 | 30.4529 | 1.5209 | 1.51742 | 52.4 |
| 5 | 16.5258 | 8.1014 | | |
| *6 | 187.1679 | 0.2 | 1.51460 | 50.0 |
| 7 | 1047.1801 | 1.1993 | 1.71300 | 53.8 |
| 8 | 14.8704 | d8 = 18.429~18.347~18.307 | | |
| 9 | 39.9719 | 3.2336 | 1.80610 | 40.9 |
| 10 | −114.933 | d10 = 6.199~6.281~6.321 | 1.80400 | |
| 11 | 452.0191 | 4.8946 | 1.49700 | 81.6 |
| 12 | −57.5905 | 1.6964 | | |
| 13 | ∞(Stop) | 11.3574 | | |
| 14 | 68.0072 | 0.9985 | 1.71300 | 53.8 |
| 15 | 32.8066 | 0.9374 | | |
| 16 | 107.005 | 6.6125 | 1.49700 | 81.6 |
| 17 | −13.4368 | 1.6621 | 1.80610 | 40.9 |
| 18 | 57.7852 | 5.8242 | 1.49700 | 81.6 |
| 19 | −24.8108 | 0.2775 | | |
| 20 | 81.2117 | 5.975 | 1.49700 | 81.6 |
| 21 | −34.873 | 0.1977 | | |
| 22 | 33.1853 | 5.727 | 1.49700 | 81.6 |
| 23 | −375.9139 | 5.0 | | |
| 24 | ∞ | 25.0 | 1.51633 | 64.1 |
| 25 | ∞ | 2.0 | | |
| 26 | ∞ | 3.0 | 1.48606 | 66.6 |
| 27 | ∞ | | | |

(Coefficient of Aspheric Surface)
r3
ε=1.1739
A4=2.95700×10$^{-05}$
A6=−3.64453×10$^{-08}$
A8=9.10168×10$^{-11}$
A10=1.01999×10$^{-14}$ r6
ε=−1105.275
A4=−1.17552×10$^{-05}$
A6=2.15535×10$^{-08}$
A8=1.83186×10$^{-10}$
A10=−3.50046×10$^{-13}$ Values of the formulae herein in the exemplary projection lens system are as follows:

|f1|/f=1.150 (1)

f2/f=2.730 (2)

f3/f=2.293 (3)

1/β2=0.041(40"Dimension-Screen) (4)

1/β2=0.043(52"Dimension-Screen) (4)

1/β2=0.044(61"Dimension-Screen) (4)

As has been described, the present invention effectively attains a projection lens system, which includes three groups of lenses of negative, positive and positive refractive powers are disposed in this order from the closest to a magnified image, is sufficiently compact and light-weighted but yet capable of projecting an image at an angle as wide as 75 degrees with sufficient field angle and brightness as represented by F number of approximately 2.4, is capable of effectively correcting chroic aberration of magnification and aberration of distortion and exhibiting optical stability against environmental variations, and is suitable to obtain an extraordinarily fine image by the magnification and projection.

What is claimed is:

1. Projection lens system in optics that comprise first to third groups of lenses in the order from the closest to a magnified image where the first lens group of negative refractive power includes one or more aspherical lenses each having an aspherical plane on one or both of the surfaces, the second lens group of positive refractive power includes one or more positive lenses, and the third lens group of positive lenses, and the third lens group of positive refractive power includes one or more cemented triplet lenses comprised of three lenses of positive, negative, and positive power joined in this order, a projection lens system is characterized by terms and conditions defined as in the following formulae:

0.9<|f1|/f<1.4 (1)

2.1<f2/f<3.4 (2)

1.9<f3/f<2.8 (3)

where f is a total focal length throughout the projecting lens system, f1 is a focal length of the first group of lenses, f2 is a focal length of the second group of lenses, and f3 is a focal length of the third group of lenses.

2. The projection lens system according to claim 1, wherein the first group of lenses includes a composite (hybrid) spherical lens(es) of glass which is bonded with thin resin at its surface and then subjected to molding so as to shape an interface between the resin and the air into an aspherical plane.

3. The projection lens system according to claim 1, wherein focusing is attained by displacement of the second group of lenses in a range satisfying the following formula:

−0.1</β2<0.1 (4)

where β2 is an imaging magnification.

* * * * *